Figure 1:
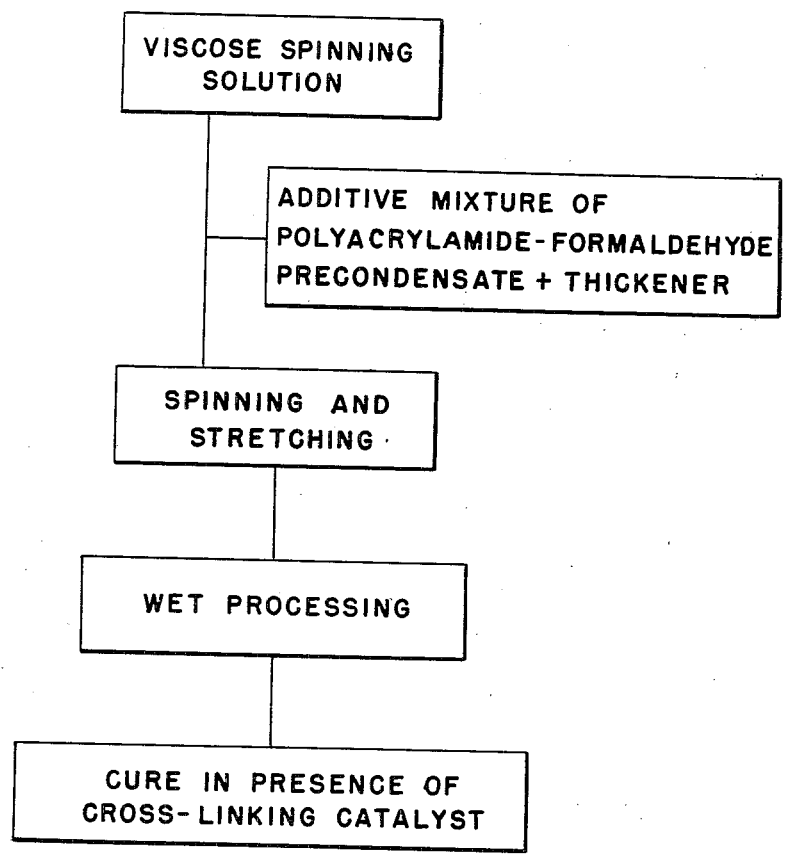

United States Patent Office 2,796,656
Patented June 25, 1957

2,796,656

MODIFIED REGENERATED CELLULOSE ARTICLES AND METHOD FOR MAKING THE SAME

Joseph W. Schappel, Morton, Pa., and William P. Dooley, South Charleston, W. Va., assignors to American Viscose Corporation, Wilmington, Del., a corporation of Delaware Application September 6, 1952, Serial No. 308,296

13 Claims. (Cl. 28—82)

This invention relates to fibers and other shaped articles comprising regenerated cellulose and a heat-hardened methylol monoamide of the type defined hereafter, characterized by markedly decreased water-sensitivity and to a method of making such articles.

Pending application Serial No. 266,243, filed January 12, 1952, discloses that the capacity of regenerated cellulose articles to pick up and retain water on exposure to moisture, and hence the cross-sectional swelling of the articles, can be reduced and controlled by means of a heat-hardened linear reaction product of formaldehyde and a linear polymer of a monoamide which may be (1) added to the viscose from which the articles are formed as a reactive methylol derivative of the monoamide polymer, which derivative may be a methylol polyacrylamide or a poly (methylol acrylamide), or (2) formed in the article by incorporating a reactive polymer of acrylamide with the viscose and then treating the shaped article with formaldehyde, the article being subsequently heated, in any case, to complete the condensation of the formaldehyde and the polymer of acrylamide.

In order to minimize hydrolysis of the reactive condensate or polymer by the alkali of the viscose and thus minimize loss of nitrogen thereby and consequent alterations in the viscose ageing or ripening rate, it is preferred to add the condensate, or the reactive polymer, to the viscose after the ageing of the viscose has been substantially completed and just prior to extruding the viscose through a shaping device. Preferably, an aqueous dispersion (which term as used herein includes solutions) of the reactive condensate or monoamide polymer is injected into the viscose as it is fed to the extruding device and in the immediate vicinity of the extruding device.

When an aqueous dispersion of a monoamide polymer such as a homopolymer of acrylamide itself, is added to the viscose and the shaped article is treated with formaldehyde to produce the reactive methylol monoamide polymer in situ in the article, the desired reduction in swelling of the article by absorption of water on exposure to moisture is obtained substantially independently of the molecular weight of the polymer introduced into the viscose. However, the same independence of molecular weight does not exist when a pre-formed reactive methylol monoamide polymer, obtained by condensation of formaldehyde and a linear polymer of a monoamide, is added as such to the viscose. As disclosed in Serial No. 266,243, the molecular weight of the reactive methylol polyacrylamide admixed with the viscose has a definite influence on the effectiveness of the heat-hardened condensate in reducing and controlling swelling of the regenerated cellulose articles. The best and most satisfactory final results are realized when the reactive methylol monoamide polymer has a relatively low molecular weight such that a 10% by weight dispersion thereof in water containing 1% by weight isopropanol has a viscosity between 20 centipoises and 500 centipoises, measured at room temperature.

It is preferred to modify the swelling characteristics and stabilize the regenerated cellulose articles by the method according to which the reactive methylol monoamide polymer is added as such to the viscose in order to avoid subsequent after-treatment of the shaped articles with formaldehyde. However, when it is attempted to inject an aqueous dispersion of a reactive methylol monoamide polymer of the most effective class and having the low molecular weight mentioned above, into the viscose, problems are encountered which arise from the low viscosity of the dispersion and the impossibility of metering it to the viscose continuously, and at a constant uniform rate using standard metering equipment. This is a serious problem because, in commercial practice, the viscose is pumped continuously, at a constant rate, to the spinneret or other device through which it is extruded into a suitable aqueous setting bath and to obtain modified filaments or other articles having uniform properties throughout it is essential to meter the dispersion of the methylol monoamide polymer to the flowing viscose stream continuously, at a constant rate, so that the amount of the methylol monoamide polymer introduced into the succeeding portions of the flowing viscose is substantially uniform. It has not been found possible to do this, using an aqueous dispersion of low-molecular weight reactive methylol monoamide polymers. Because of the low viscosity of the dispersion containing the permissible proportions of the methylol monoamide polymer, it issues from the injector in irregular spurts even when the pressure is maintained constant. The result is that the proportion of the methylol monoamide polymer incorporated in the moving viscose varies at the different portions thereof and filaments, for example, formed under normal, commercially feasible spinning conditions from the mixture comprise varying amounts of the reactive methylol monoamide polymer along their lengths and, as a consequence, various amounts of the heat-hardened condensate whereby the swelling characteristics of the final filaments vary along the length of the individual filaments.

It is an object of this invention to provide an improved method for making regenerated cellulose of reduced water-sensitivity from a mixture comprising viscose and a reactive linear methylol monoamide polymer and particularly a reactive low-molecular weight methylol monoamide polymer. Another object is to provide such a method in which an aqueous dispersion (including a solution) of a reactive low-molecular weight methylol monoamide polymer is continuously injected into the viscose in accurately metered constant amounts as the viscose is continuously fed to a shaping device through which it is extruded into a suitable coagulating and/or coagulating and regenerating bath. A further object is to provide a new composition of matter comprising a reactive methylol monoamide polymer and a cellulose ether which is adapted to be continuously injected into viscose in constant, accurately controlled amounts.

Figure 2:
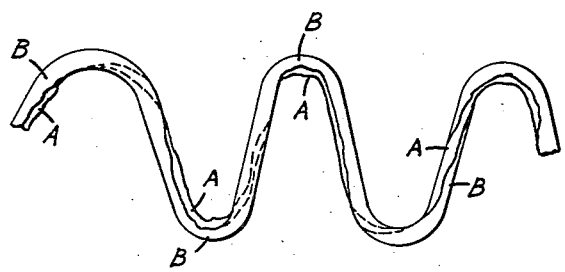

These and other objects which will appear hereinafter are accomplished by the present invention in accordance with which a reactive linear methylol monoamide polymer is introduced into viscose, preferably after ripening thereof to the predetermined salt point at which it is to be extruded, conjointly with, or in admixture with a small amount of an alkali-soluble cellulose ether. The process and the filamentary product of the invention are illustrated by Figures 1 and 2 respectively. Figure 1 is a flow-sheet of the general process of the invention and is self-explanatory; Figure 2 illustrates one type of filament which can be formed by this process and will be described later.

It is found, according to the invention, that aqueous solutions or dispersions containing the relatively low molecular weight reactive linear methylol monoamide polymers in concentrations useful for reducing the swelling of regenerated cellulose and also containing a comparatively small amount of an alkali-soluble cellulose ether have appreciably increased viscosity as compared to unmodified solutions or dispersions of the reactive methylol monoamide polymers. The viscosity of the aqueous solution or dispersion containing the viscosity-modifying cellulose ether is such that the solution or dispersion can be metered at a constant, continuous rate, so that the dispersion can be injected into the viscose continuously, to introduce a controlled, uniform proportion of the reactive condensate to all portions of the viscose flowing to the spinneret or the like, using small amounts of the cellulose ether which do not interfere in any way with subsequent heat-hardening of the reactive condensate to final thermoset condition.

Various cellulose ethers and various types of cellulose ethers may be used to modify the viscosity of the aqueous solution or dispersion of the reactive linear methylol monoamide polymer, including simple alkyl ethers such as ethyl cellulose, hydroxyalkyl ethers such as hydroxyethyl cellulose, carboxyalkyl ethers such as carboxymethyl cellulose, and mixed ethers of those classes. As is well known, the solubility of the cellulose ethers depends on the degree of substitution, that is, the ratio of ether groups to anhydroglucose units, and ethers may be obtained which are organic-solvent soluble, water-soluble and aqueous alkali-soluble, or water-insoluble and aqueous alkali-soluble. Methods for making ethers of these various types have been described and are known in the art. In the preferred embodiments of the present invention, the cellulose ether is of the water-soluble, alkali-soluble type. Broadly speaking, in those preferred ethers the ratio of ether groups to anyhdroglucose units falls within the range 0.1:1 to 2.5:1, depending upon the particular ether. In water-soluble alkali-soluble methyl cellulose the average degree of substitution is between 0.5 and 2.2 ether groups per anhydroglucose unit. The ratio of ether groups to anhydroglucose units in water-soluble, alkali-soluble ethyl cellulose is between 0.5 and 1.3. Water-soluble hydroxyethyl celluloses have an average degree of substitution of between 0.1 to 1.0 ether groups to one anhydroglucose unit, while those hydroxyethyl celluloses in which the average degree of substitution is greater than 1.0 ether groups per anhydroglucose unit are soluble in water and in aqueous alkaline solutions. Water-soluble alkali-soluble carboxymethyl celluloses contain between 0.3 and 2.5 ether groups per anhydroglucose unit, while in the water-soluble, alkali-soluble carboxyethyl celluloses the ratio of ether groups to anhydroglucose units is between 0.3:1 and 1.0:1. The presently preferred specific cellulose ether is water-soluble, alkali-soluble carboxymethyl cellulose.

The cellulose ethers are peculiarly suitable for use as viscosity modifiers for the aqueous dispersions of the reactive linear methylol monoamide polymers to be injected into viscose since they are compatible with cellulose, do not exert a degrading action on the cellulose, and do not adversely affect the ageing characteristics of the viscose or result in discoloration of the regenerated cellulose fibers or yarns. Furthermore, the increase in viscosity of the dispersions is only one of the improvements which are realized by the incorporation of the ether in the resin dispersion and in the viscose. The cellulose ethers which are retained in the final product have a direct, beneficial effect on the regenerated cellulose fibers and yarns and more particularly on the dry and wet extensibilities of the fibers and yarns. Unexpectedly, it is found that the dry and wet extensibilities of the yarns and fibers are higher than the dry and wet extensibilities of fibers and yarns comprising the heat-hardened methylol monoamide polymer but which do not comprise the cellulose ether. The increased dry extensibility of the present fibers is particularly advantageous since it directly affects the workability of the fibers and yarns, which can be processed on conventional textile processing equipment without difficulty. Because of their increased extensibility resulting from the presence of the cellulose ether with the methylol monamide polymer, the fibers can be carded with minimum or no fiber breakdown and this is a major advantage since it is known that regenerated cellulose fibers comprising a synthetic resin are often damaged severely during carding and may even be reduced to a powder.

The reactive methylol monoamide polymer added to the viscose for the purpose of reducing the water-sensitivity of and stabilizing the regenerated cellulose articles is a linear reaction product or linear reactive partial condensate of formaldehyde and a linear polymer of a monoamide as defined below and preferably of a methylolated polymer of acrylamide, at least 30% by weight of the monomeric units of which contain methylol amido groups. The term a monoamide is intended herein as a generic expression for the restricted class of related compounds which may be more technically defined as follows: a mono-amide, having a single unsaturated carbon-to-carbon linkage, of an acid of the group consisting of acrylic acid and alpha-alkyl- or beta-alkyl-substituted alpha-methylene monocarboxylic acids and N-alkyl substituted derivatives thereof, the alkyl substituents consisting of methyl or ethyl radicals, the amide having only a single carbonyl group attached to the N-atom and at least one hydrogen atom attached to the N-atom. These monoamides have the general formula

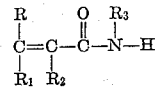

in which R, R₁, R₂, and R₃ are each selected from the group consisting of hydrogen, methyl, and ethyl, and many be the same or different than one or more others of the group.

The term a monoamide polymer or polymer of a monoamide is intended to be generic to homopolymers and copolymers of the compounds just defined, whether they are produced directly by polymerization or copolymerization or indirectly by hydrolysis, saponification or other reaction upon a previously produced polymer or copolymer. Typical comonomers which may be copolymerized with the monoamide as defined herein include vinyl acetate, vinyl chloride, acrylic acid, acrylonitrile, methacrylic acid, methacrylonitrile, vinylidene chloride, ethylene, mixtures thereof, or any other monoethylenically unsaturated monomer which is copolymerizable with the acrylamide to yield copolymers which in the form of their partially condensed methylol derivatives are water-soluble or water-dispersible resin precondensates.

The linear reaction product or linear reactive methylol monoamide polymer may be produced (1) by reacting acrylamide itself or substituted acrylamide (within the definition adopted herein) with formaldehyde to obtain a monomeric condensate and then polymerizing the reaction product to obtain a linear reactive polymeric condensate; (2) by polymerizing or copolymerizing acrylamide or substituted acrylamide (as defined herein) to obtain a linear reactive polymer of the amide and thereafter reacting the polymer with formaldehyde, or (3) by hydrolyzing a polymer or copolymer of acrylonitrile or an alkyl-substituted acrylonitrile such as methacrylonitrile, to produce a polymeric product in which, preferably, at least 30% of the monomeric units comprise amido groups, and then reacting the hydrolyzed product with formaldehyde to obtain a methylol monoamide polymer containing, preferably, at least 30% of methylolamido groups. The polymeric products may be produced by standard solution or emulsion polymerization techniques in the presence of a peroxy catalyst such as potassium persulfate.

The term a methylol monoamide polymer as used herein is broadly intended to cover partial condensates of formaldehyde and a monoamide polymer which may also be regarded as methylol derivatives of a monoamide polymer containing one or more methylol groups per monomeric amide unit, regardless of the method by which the partial condensates are obtained.

While the molecular weight of the linear reactive methylol monoamide polymer in the dispersion comprising the cellulose ether may vary, this invention is primarily concerned with those reactive methylol monoamide polymers of relatively low molecular weight which, in 10% concentration in water containing 1% isopropanol, yield solutions or dispersions having a viscosity between 20 and 500 centipoises since it is with such methylol monoamide polymers that the most pronounced reduction in the swelling of the regenerated cellulose articles is obtained and, also, it is with aqueous dispersions of those relatively low molecular weight methylol monoamide polymers that difficulty is experienced when it is attempted to inject the dispersion into the viscose flowing to the extruding device.

In preparing the aqueous dispersions for addition to the viscose, the water-soluble or alkali-soluble cellulose ether, as a particulate solid or as an aqueous solution or dispersion, may be mixed with an aqueous dispersion of the linear reactive methylol monoamide polymer having a viscosity at room temperature between 20 centipoises and 500 centipoises in an amount sufficient to yield a final dispersion having a viscosity at room temperature between 750 centipoises and 4000 centipoises, and this dispersion is metered to the viscose continuously, at a rate to introduce into the viscose from 5% to 15% or more of the reactive methylol monoamide polymer and from 0.5% to 3.0% of the cellulose ether, based on the weight of the cellulose in the viscose. Comparatively small amounts of the cellulose ether have a striking effect on the viscosity of aqueous dispersions of the methylol monoamide polymer. The concentration of cellulose ether in the aqueous solution mixed with the dispersion of the methylol monoamide polymer may vary, depending on the particular ether used, but in general the solution should have a concentration such that the methylol monoamide polymer solids content of the final dispersion is not less than 5%.

The regenerated cellulose articles comprising the heat-hardened methylol monoamide polymer are characterized by decreased water-sensitivity, decreased cross-sectional swelling in water, and decreased water-retention capacity, and fabrics made from the filaments or yarns are stabilized against progressive dimensional shrinkage on repeated washing. The extent of the reduction in water-retention and swellability and of increase in stability is, generally speaking, related to the proportion of methylol amido groups to total monomeric units in the molecule in the reactive methylol monoamide polymer added to the viscose. In general, the more pronounced stabilization effect and reduction in water-sensitivity are obtained the larger the proportion of methylol amido groups.

Those reactive methylol monoamide polymers or partial condensates containing 30% to 70% methylol amido groups are useful to provide a controlled and predetermined reduction in water retention and swellability, such as is particularly desirable for filter fabrics wherein a definite but limited swelling is desired to reduce the size of the interstitial spaces between the woven yarns. To obtain maximum stabilization, it is preferred to add reactive methylol monoamide polymers containing a higher proportion of methylol amido groups to the viscose. Reactive partial condensates of formaldehyde and homopolymers of acrylamide itself are specifically preferred because they are readily available at low cost and result in a practical degree of stabilization of the regenerated cellulose fibers or yarns, and fabrics made therefrom, in a simple manner and without requiring the incorporation of an excessive amount of the reactive condensate in the viscose.

As already stated, the dispersion of the linear reactive methylol monoamide polymer and cellulose ether having a viscosity at room temperature between 750 centipoises and 4000 centipoises is injected into the viscose continuously at a rate such that the viscose emerging from the extrusion device contains from 5% to 15% or more of the reactive methylol monoamide polymer and 0.5% to 3.0% of the cellulose ether, the percentages being by weight based on the weight of the cellulose in the viscose. Optimum results are obtained when the viscose contains 10% of the linear reactive methylol monoamide polymer based on the weight of the cellulose therein.

The viscose used may have any spinnable composition and may be a "normal" viscose having a sodium chloride salt test value of from 3 to 6, containing from 6% to 9% cellulose and from 6% to 9% sodium hydroxide and of normal spinning viscosity, i. e., having a ball fall viscosity in the neighborhood of 35 seconds at 18° C.

The setting bath into which the viscose containing the linear reactive methylol monoamide polymer and cellulose ether is extruded may be a coagulating and cellulose-regenerating bath of the composition normally used in the manufacture of fibers or yarns from viscose. Aqueous baths containing from 7% to 13.5% sulfuric acid and from 18% to 28% sodium sulfate are satisfactory. The bath may also contain comparatively small amounts, for example, from 0.1% to 5% of zinc sulfate or its equivalent as well as small amounts of other adjuvants or assistants. If it is desired to produce self-crimpable fibers of the type described in U. S. Patent 2,517,694 to Merion and Sisson, spinning baths as described in that patent may be used. That patent points out that a spinning bath of the type just mentioned has, because of its high salt content, a rapid dehydrating action on the extruded filaments and sets up thereon an at least partially regenerated skin of substantial thickness around a still liquid or soft plastic core. This skin is set up rapidly and because of the dehydrating action of the coagulating bath has a strong tendency to shrink circumferentially so as to reduce the filament diameter. But this force is overcome by the incompressible core, whereupon the skin ruptures longitudinally along the filament, permitting part of the core to flow through the rupture. In this state the filaments are finally set up. That portion of the resulting filaments which was forced out of the core responds to subsequent stretching differently from the remainder of the filaments, as if it has originated from a different viscose. One portion of the cross-section has a thick skin showing a break along its juncture with the other portion which has a thin skin or none at all. In the crimped filaments the portion having the thick skin always takes the inside of the bends of the crimp, because of a strong tendency to shrink. The crimped filament takes the form of a regular or irregular helical coil. This filament is illustrated in Figure 2 in which the portion A has a thick skin and portion B has a thin skin or no skin at all.

The invention is also adapted to production of the modified shaped regenerated cellulose articles by a two-bath process in which the viscose-reactive methylol monoamide polymer cellulose ether mixture is extruded into a coagulating bath which effects little, if any, regeneration of the cellulose, and the article comprising cellulose xanthate, the methylol monoamide polymer and the added cellulose ether is subsequently treated with a cellulose-regenerating medium to obtain regenerated cellulose articles which can be heated to insolubilize the methylol monoamide polymer.

Although the reactive methylol monoamide polymer is added to the viscose in water-soluble or water-dispersible condition, there is no scumming of the bath or other evidence that either the partial condensate or the cellulose ether is leached out during spinning or after-treating of the shaped articles. Also, analysis for nitrogen on the final articles comprising the insolubilized methylol monoamide polymer show that the reactive methylol monoamide polymer added to the viscose with the cellulose ether is retained. Therefore, the proportion of methylol monoamide polymer in the final article corresponds substantially to the amount thereof injected into the viscose. The cellulose ether is also retained and is fixed in the shaped article in the acid setting bath. The retention of the reactive methylol monoamide polymer during spinning and after-treatment of the fibers or the like is apparently attributable to the linear structure of these partial condensates which causes them to become tangled or meshed with, and restrained from leaching out by, the cellulosic chains of the viscose. At the same time, their linear structure permits them to flow and align themselves with the cellulose chains during extrusion of the viscose-methylol monoamide polymer cellulose ether mixture and stretching of the shaped article for orientation of the molecules and improvement in tensile strength.

Permanent modification of the moisture pick-up and retention capacity of the regenerated cellulose yarn or the like (control of cross-sectional swelling) is obtained by "curing" the methylol monoamide polymer that is by bringing the reaction between the formaldehyde and the monoamide polymer to completion, which involves heating the shaped article to curing or baking temperature. It is believed that the modification of the regenerated cellulose results primarily from reaction between the molecules of the reactive methylol monoamide polymer aligned with the cellulose chains, with the formation of bonds or bridges between the free amido groups of the methylol monoamide polymer which bridges, or at least some of them, span the cellulose chains and serve to stabilize them, although the possibility that some cross-linking of hydroxyl groups on the cellulose chains occurs is not excluded.

The reactive methylol monoamide polymer can be cured (that is, the reaction between the formaldehyde and the monoamide polymer can be brought to completion) by heating the regenerated cellulose formed from the viscose to which the aqueous dispersion or solution of the reactive methylol monoamide polymer and cellulose ether has been added at a temperature of 100° C. to 170° C., preferably at 140° C. to 160° C. for a time interval usually varying inversely with the temperature between 5 minutes and 30 minutes, and, preferably, in the presence of an acidic catalyst. The article comprising regenerated cellulose, the reactive methylol monoamide polymer and the cellulose ether may be treated with an aqueous solution of the acidic catalyst, dried, and then heated to complete the condensation of the formaldehyde and polymer, the drying and heating being performed in two stages or in a single stage. The article to be heated to curing temperature comprises residual acidic catalyst. The amount of catalyst remaining on the article when it is heated to cure and insolubilize the methylol monoamide polymer may vary but usually when it is treated with a solution containing the catalyst in concentrations between 0.25% and 0.50% by weight, the amount of residual acidic catalyst on the article is sufficient to catalyze the condensation of the formaldehyde and monoamide polymer. In selecting the catalyst, preference is given to those catalysts which catalyze the reaction of a monoamide polymer and formaldehyde and the more strongly acid catalysts which favor the reaction between formaldehyde and cellulose are preferably avoided. Any acidic catalyst which is known to catalyze urea-formaldehyde and melamine-formaldehyde reactions may be used. The useful catalysts may also be described as those water-soluble acids and acid salts which, in concentrations between 0.25% and 0.50% by weight in water, form aqueous solutions having a pH between 2.5 and 5, or which, on heating, dissociate to evolve a volatile base, leaving an acidic residue. Highly acid catalysts which in aqueous solution have a pH lower than 2.5, such as sulfuric acid, are preferably avoided so as to minimize direct reaction of the formaldehyde with the cellulose and also to avoid degradation of the cellulose. Examples of preferred catalysts are monobasic and dibasic ammonium phosphates and lactic, citric, tartaric, formic, propionic, boric and succinic acids. The cellulose ether present in the regenerated cellulose articles does not interfere with curing of the methylol monoamide polymer or detract from the effectiveness of the resin as swelling modifier and stabilizer for the article.

The textile or the like comprising the residual acidic catalyst may be heated to curing temperature for the methylol monoamide polymer at any stage after its production. The yarns may be initially dried and then heated to complete the reaction between the formaldehyde and a monoamide polymer, or initially dried yarns may be woven, knitted or otherwise fabricated and then heated to bring the reaction to completion. If the yarns are in crimped condition, it is generally preferred to complete the condensation of the formaldehyde and the acrylamide polymer after the yarns have been spun, processed and dried in relaxed condition. The heating is performed on the relaxed yarns to set the crimp and to preserve it during working up of the yarns. In other instances, it may be preferable to complete the condensation after the yarns are fabricated or during finishing of the fabrics.

The cellulose ether which is also present in the fibers or the like does not interfere with heat-hardening of the methylol monoamide polymer and is not itself adversely affected by the elevated temperatures employed.

The following example, in which parts and percentages are by weight unless otherwise stated, is illustrative of an embodiment of the invention. The example includes a table in which the water-retention, tensile strength and elongation of yarns formed from viscose containing a linear reactive methylol monoamide polymer and a cellulose ether are compared with the same properties of yarns formed from a viscose containing the same amount of the linear reactive methylol monoamide polymer but which did not contain an added cellulose ether. In both instances, the yarns were weighed and conditioned at 58% relative humidity and 70° F. prior to being tested. The test for water-retention is more or less standardized and involves soaking the yarns in water, centrifuging them to remove the excess water, and weighing the yarns. The difference between the weight of the conditioned yarns prior to the soaking and centrifuging and the weight of the centrifuged yarns is a measure of the water-retention capacity of the yarns. The specific conditions under which this test is performed may vary somewhat. In the present case, the conditioned yarns were soaked for 15 minutes in distilled water at room temperature, wrapped in a cotton muslin fabric, soaked in water for an additional 15 minutes at room temperature, and then centrifuged for 3 minutes in a centrifuge having a diameter of 17 inches and rotating at a speed of 1800 R. P. M. The values obtained for the yarns from the two types of modified viscose, i. e., one containing the added cellulose ether and the other not containing it by testing the water-retention capacity of the yarns by methods involving variations in our soaking time and temperature, centrifuging time, and speed at which the centrifuge is rotated have the same relationship to each other as the values obtained under our conditions.

EXAMPLE

A particulate low-molecular weight linear reactive condensate of formaldehyde and a homopolymer of acrylamide was dispersed in water at room temperature to obtain a dispersion containing 10% solids by weight and having a viscosity of 110 centipoises. A sufficient amount of an aqueous 4.3% by weight solution of water-soluble, alkali-soluble carboxymethyl cellulose was added to the dispersion to increase the viscosity of the dispersion to 3300 centipoises. The final dispersion contained 7.95% of the formaldehyde-polyacrylamide precondensate and 0.85% of the cellulose ether, on the total dispersion weight. This dispersion was injected at a constant rate of 0.95 gms./minute into viscose containing 7.4% of cellulose, 7% of sodium hydroxide and aged to a sodium chloride salt test value of 5, and flowing continuously at a constant rate of 9.3 gms./minute to a spinneret, just ahead of the spinneret. About 10% by weight precondensate solids on the weight of the cellulose was introduced into the viscose. No mechanical difficulties were experienced in continuously injecting the dispersion into the viscose at a constant rate. The mixture of viscose, methylol polyacrylamide, and carboxymethyl cellulose was spun through the spinneret into an aqueous coagulating and regenerating bath containing 10% sulfuric acid, 4.5% zinc sulfate and 24% sodium sulfate at about 45° C. The filaments obtained were given a 13 inch immersion in the bath, withdrawn, stretched 40% between godets to obtain a 150 denier, 40 filament yarn which was processed by washing to remove adhering spinning bath, desulfiding, bleaching, antichlor treating, and rinsing. The yarn was soaked in an aqueous solution of 0.25% diammonium phosphate, dried at 100° C., and then heated at 150° C. for 30 minutes to complete the condensation of the formaldehyde and polyacrylamide, scoured and dried. The yarns were then conditioned and tested as described above. Those conditioned yarns are designated A in the table below. Yarns A were compared with similarly conditioned yarns (B in the table) formed from a viscose of the same composition and containing 10% on the cellulose weight of the reactive formaldehyde-polyacrylamide condensate but which did not contain carboxymethyl cellulose or other added cellulose ether, the control yarns B comprising the formaldehyde-polyacrylamide condensate which had been brought to the fully condensed condition by heating the yarns at 150° C. for 30 minutes. Yarns A and B were compared with yarns obtained from a viscose of the same cellulose and sodium hydroxide contents and of the same sodium chloride salt point but containing neither the methylol polyacrylamide nor cellulose ether, and designated C in the table.

Table

| | Percent Water Retention | Tentile, Strength, Gms./denier | | Elongation, Percent | |
|---|---|---|---|---|---|
| | | Dry | Wet | Dry | Wet |
| A | 54 | 2.1 | 1.3 | 17.2 | 20.7 |
| B | 53 | 2.6 | 1.4 | 13.0 | 12.3 |
| C | 85 | 2.5 | 1.3 | 21.0 | 29.5 |

It will be observed that, although the swelling properties of the two yarns are approximately the same, the wet and dry extensibilities of the yarns formed from the viscose containing both the formaldehyde-polyacrylamide condensate and the carboxymethyl cellulose ether are substantially higher than the extensibilities of the yarns which did not contain the cellulose ether. As explained above, the increased dry extensibility imparts increased workability to the yarns.

The invention has been described in detail in connection with the production of continuous filaments, continuous filament yarns or fabrics containing them. Discontinuous staple fibers may be obtained by cutting or otherwise disrupting the modified continuous filaments or continuous filament yarns to obtain a mass of modified short fibers adapted to be spun into a yarn or used in the production of a non-woven fabric or felt-like article. Discontinuous or staple fibers having modified swelling properties in water may also be obtained by reducing continuous filaments or continuous filament yarns comprising the linear reactive methylol monoamide polymer to short fibers which may be treated with the acidic catalyst solution in bulk, after spinning into a yarn, or in fabricated structures comprising the fibers or spun yarns. Heating of the short fibers to bring the reactive partial condensate to the insoluble state may be performed at any time after the fibers have been treated with the acidic catalyst solution.

The discontinuous fibers may be heated to the curing or baking temperature in bulk if they have been treated previously with the catalyst solution, or the spun yarns or fabricated structures may be heated. Crimped staple or discontinuous fibers comprising the partial or reactive condensate and residual catalyst are set in the crimped condition as a result of the baking, provided they exist in the crimped condition when they are heated to the curing temperature. For example, when fibers comprising the reactive condensate, cellulose ether and residual catalyst, and having the cross-section of the fibers described in Merion and Sisson Patent No. 2,517,694, are heated to the curing temperature in the relaxed, crimped condition the crimp is permanently set in the fibers.

As previously pointed out, and as shown above, the aqueous solution or dispersion containing the cellulose ether and the linear reactive condensate of formaldehyde and a polymer of a monoamide can be injected into the viscose continuously, at a controlled constant rate, without difficulty. Since the proportion of the reactive condensate and of the cellulose ether introduced into each succeeding portion of the viscose flowing to and through the spinneret is substantially uniform, the proportion and distribution of the cellulose ether and fully condensed condensate in the final cured yarns are also substantially uniform at all portions of the yarn or other article.

Regenerated cellulose films having decreased swellability in the presence of moisture may also be obtained by extruding the viscose-reactive condensate-cellulose ether mixture through a suitable device.

Various modifications and adjustments may be made in practicing the invention without departing from its spirit and scope and it is to be understood, therefore, that the invention is not to be limited except as defined by the appended claims.

We claim:

1. A shaped article comprising regenerated cellulose, 0.5% to 3% by weight of an alkali-soluble cellulose ether, and an insoluble reaction product of formaldehyde with a linear polymer of a monoamide of the formula

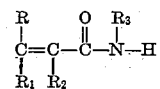

in which R, $R_1$, $R_2$ and $R_3$ are each selected from the group consisting of hydrogen, methyl, and ethyl, said reaction product being present in an amount of not over 15% by weight, the percentages being based on the weight of the regenerated cellulose.

2. Crimped fibers and yarns comprising regenerated cellulose, 0.5% to 3% of an alkali-soluble cellulose ether, and an insoluble reaction product of formaldehyde with a linear polymer of a monoamide having the formula

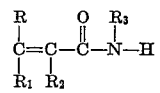

in which R, $R_1$, $R_2$, and $R_3$ are each selected from the group consisting of hydrogen, methyl, and ethyl, said reaction product being present in an amount of not over 15% by weight, the percentages being based on the weight of the regenerated cellulose.

3. A regenerated cellulose filament comprising between 0.5% to 3% of an alkali-soluble cellulose ether and an insoluble reaction product of formaldehyde with a linear polymer of a monoamide having the formula

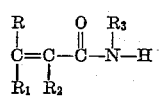

in which R, $R_1$, $R_2$, and $R_3$ are each selected from the group consisting of hydrogen, methyl, and ethyl, said reaction product being present in an amount of not over 15% by weight, the percentages being based on the weight of the regenerated cellulose.

4. The article of claim 3 wherein the cellulose ether is water-soluble carboxymethyl cellulose and the insoluble reaction product is a condensate of formaldehyde and a linear homopolymer of acrylamide.

5. A regenerated cellulose filament comprising 0.5% to 3% of a water-soluble and alkali-soluble carboxymethyl cellulose and an insoluble reaction product of formaldehyde with a linear homopolymer of acrylamide, said reaction product being present in an amount of not over 15% by weight, the percentages being based on the weight of the regenerated cellulose.

6. The method of producing extruded articles comprising regenerated cellulose and having a decreased water-sensitivity as compared to normal regenerated cellulose articles which comprises advancing a stream of viscose at a constant rate to an extruding device, continuously injecting into the advancing stream of viscose immediately in advance of the extruding device an aqueous dispersion of an alkali-soluble cellulose ether and a low molecular weight partial condensate of formaldehyde with a polymer of a monoamide, this dispersion being injected at a rate to introduce into the viscose not over 15% of said partial condensate and from 0.5 to 3.0% of the cellulose ether, these percentages being based on the weight of the cellulose in the viscose, extruding the viscose-formaldehyde-polymer-cellulose ether mixture into an aqueous setting bath, and subsequently insolubilizing the partial condensate of formaldehyde with the polymer by heating, said polymer being a linear polymer of a monoamide having the formula

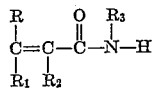

in which R, $R_1$, $R_2$, and $R_3$ are each selected from the group consisting of hydrogen, methyl, and ethyl.

7. The method of claim 6 wherein the partial condensate is that of formaldehyde with a homopolymer of acrylamide.

8. The method of claim 6 wherein the cellulose ether is a water-soluble, alkali-soluble carboxymethyl cellulose.

9. The method of claim 6 wherein the aqueous dispersion of the partial condensate and the cellulose ether has a viscosity between 750 centipoises and 4000 centipoises.

10. The process of producing a crimped yarn comprising advancing a stream of viscose at a constant rate into a spinneret, continuously injecting an aqueous dispersion of additive into the flowing stream of viscose immediately in advance of the spinneret, said dispersion containing a carboxymethyl cellulose and a partial condensate of formaldehyde with a linear homopolymer of acrylamide, these components being injected at a rate such that the viscose emerging from the spinneret contains not over 15% of said partial condensate and 0.5 to 3.0% of the carboxymethyl cellulose, the percentages being based on the weight of the cellulose in the viscose, spinning the resulting viscose into an aqueous coagulating bath containing 7% to 13.5% $H_2SO_4$, 18% to 28% of an alkali metal sulfate, and 0.1% to 5% $ZnSO_4$, recovering from the spinning bath a plurality of filaments, stretching the withdrawn filaments in the form of a yarn, washing and drying the yarn in relaxed form so as to impart a crimp thereto, and thermally curing the crimped yarn to cause condensation between the formaldehyde and the homopolymers, whereby the crimp is firmly set.

11. As a new composition of matter, a mixture comprising a spinnable viscose, 0.5% to 3.0% of an alkali-soluble cellulose ether and a partial condensate of formaldehyde with a linear polymer of a monoamide, said reaction product being present in an amount of not over 15% by weight, the percentages being based upon the weight of the cellulose in the viscose, the aforesaid monoamide having the formula

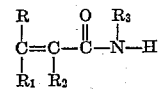

in which R, $R_1$, $R_2$, and $R_3$ are each selected from the group consisting of hydrogen, methyl, and ethyl.

12. Composition of claim 11 wherein an aqueous 10% dispersion of the partial condensate in water containing 1% isopropanol has a viscosity between 20 centipoises and 500 centipoises.

13. Composition of claim 11 wherein the partial condensate is that of formaldehyde with a homopolymer of acrylamide.

References Cited in the file of this patent

UNITED STATES PATENTS

| | | |
|---|---|---|
| 1,955,825 | Palmer | Apr. 24, 1934 |
| 2,155,067 | Ubbelohde | Apr. 18, 1939 |
| 2,376,934 | Morgan | May 29, 1945 |
| 2,684,343 | Dixon | July 20, 1954 |